United States Patent [19]
Lumsden

[11] Patent Number: 5,299,266
[45] Date of Patent: Mar. 29, 1994

[54] MULTI MACHINE MONITOR FOR TV POST PRODUCTION

[75] Inventor: John L. Lumsden, Boca Raton, Fla.

[73] Assignee: Sony Electronics Inc., Park Ridge, N.J.

[21] Appl. No.: 854,705

[22] Filed: Mar. 20, 1992

[51] Int. Cl.$^5$ ............................................. H04B 1/00
[52] U.S. Cl. ................................................ 381/119
[58] Field of Search ......................... 381/1, 118, 119

[56] References Cited

U.S. PATENT DOCUMENTS

| | | |
|---|---|---|
| 4,201,895 | 5/1980 | Hill, Jr. . |
| 4,479,240 | 10/1984 | McKinley, Jr. .................. 381/118 |
| 4,521,870 | 6/1985 | Babbel et al. . |
| 4,635,288 | 1/1987 | Stadius ........................... 381/119 |
| 4,746,994 | 5/1988 | Ettlinger . |
| 4,815,131 | 3/1989 | Okamoto ............................. 381/1 |
| 4,858,033 | 8/1989 | Chippendale . |
| 4,879,751 | 11/1989 | Franks et al. . |

FOREIGN PATENT DOCUMENTS

0251646  1/1988  European Pat. Off. .
2505107 11/1982  France ............................. 381/119
2255696  3/1991  United Kingdom .

*Primary Examiner*—Forester W. Isen
*Attorney, Agent, or Firm*—Ronald P. Kananen

[57] ABSTRACT

The invention is generally directed to a multi machine monitor for use in a television post production environment. An editor controller receives commands through a human interface for selecting the signals to be previewed. An individual signal or a pair of signals may be selectively previewed so that the level of the selected can be set. Depending upon whether the signal is being used in a mix, the setting of the signal level may or may not interfere with the mix. The signals may be selected from pre-fader signals, post-fader signals, with the left and/or right channels being individually selectable. The VCAs associated with the selected signals may be muted so that the previewing of the signal does not interfere with a mix that may be occurring. The signals to be previewed are transmitted through a solo bus without the need for manual switching or separate activate lines.

17 Claims, 2 Drawing Sheets

MULTI MACHINE MONITOR FOR TV POST PRODUCTION

BACKGROUND OF THE INVENTION

1. Field of the Invention

The invention generally relates to an apparatus and method for previewing signals and, more particularly, to an apparatus and method for previewing audio signals in a multi machine monitor for TV post production.

2. Description of Prior Art

The creation of an audio/visual program involves the mixing of audio signals in with video signals. Before performing a mix, it is advantageous to preview the audio signals. Previewing is the monitoring of the audio and/or video signals by the operator. Typically, the previewing occurs prior to any mixing in order to set the levels of the audio signals. Once the levels are set and the mixing process has begun, the previewing has been generally limited to just the resultant audio/visual mix.

In a conventional mixing apparatus, the capability of previewing had been very limited. In an audio/video editing system, such as the one disclosed in U.S. Pat. No. 4,521,870 to Babbel et al., a preview switcher provides the mixed video information to a video display so that the operator can monitor the resultant video mix.

In another conventional mixing apparatus, such as the one disclosed in U.S. Pat. No. 4,201,895 to Hill, Jr., the mixing apparatus is capable of individually monitoring either individual signals or the resultant mixed signal. The selection process, however, is rather burdensome. In order to select an individual signal, a level controller for the signal must be set to its lowest position so that the signal is coupled to a rotary select switch. The operator can then rotate the rotary select switch until the arm of the switch contacts the signal line. The selection of the signal, however, decouples the signal from the mixed signal, thereby interfering with any recording process that may be occurring. The selection process also requires the use of separate manual selectors for each signal or signal group to be monitored.

Thus, it is a problem in the prior art to preview a signal while performing a mix without interfering with the ongoing mixing session.

It is also a problem in the prior art to select the signal to be monitored since the selection process involves manually connecting the signal to the previewer.

SUMMARY OF THE INVENTION

It is an object of the present invention to provide a multi machine monitor which can selectively preview a signal and set its level before performing a mix.

It is another object of the present invention to provide a multi machine monitor which can selectively preview an individual signal while performing a mix and not interfere with the ongoing mixing session.

It is a further object of the present invention to provide a multi machine monitor which can selectively preview one signal out of a pair of signals and set its level without interfering with the other signal.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, the multi machine monitor for TV post production comprises a fader for setting the levels of an input audio signal, a solo bus, a solo activate bus, a mixing bus for mixing the input signal with on or more other input signals, and switches for selecting either the pre-fader signal or post-fader signal and for connecting the selected signal to the solo bus, and a decoder for decoding activation signals from select signals for controlling the switches.

The present invention improves upon the prior art by providing an apparatus which decodes the activation signals from the select signals when using the solo busing of a conventional mixing console. This enables easy monitoring of the line outputs (selectively) of one, two or four track video tape machines without the use of manual select switching or separate activate lines. The present invention also allows signals to be previewed during a mixing session without effecting the mixing session.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Reference will now be made in detail to the preferred embodiment of the invention, an example of which is illustrated in the accompanying drawings.

Figure 1:
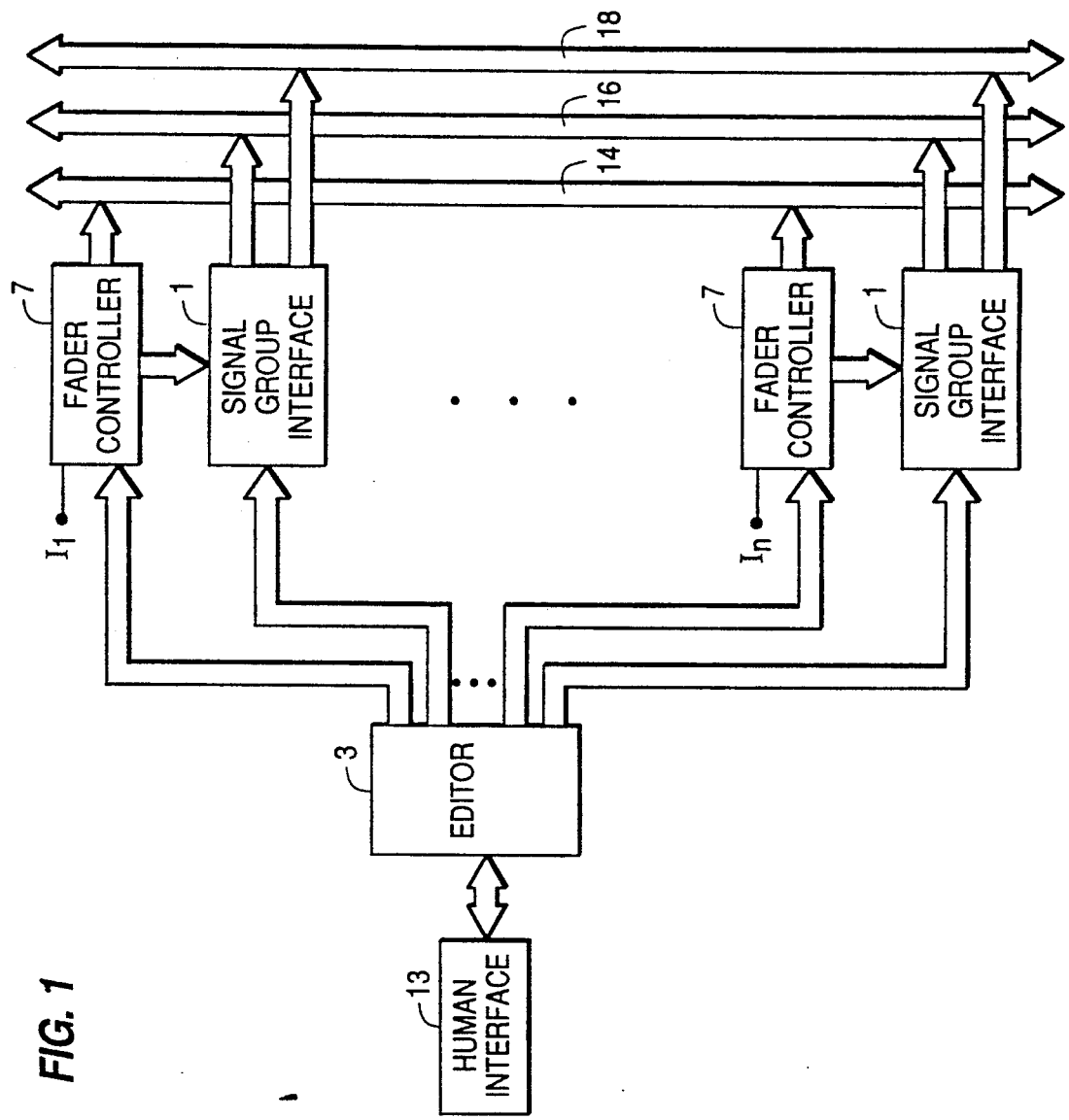
FIG. 1 illustrates a schematic view of a multi machine monitor of the present invention.

FIG. 1 illustrates a block diagram of the multi machine monitor. As shown in FIG. 1, an editor 3, preferably a video editing computer, is connected to a human interface 13, a plurality of signal group interfaces 1, and a plurality of fader controllers 7. Preferably, for example, the editor 3 may be a Sony editor BVE 900 or BVE 9000. The human interface 13 may be any suitable apparatus capable of enabling an operator to control the editor 3. Thus, for example, the human interface 13 may be a keyboard, a touch-controlled screen, or a mouse. The editor 3 decodes command signals from the human interface 13 and produces appropriate editor command signals to the fader controllers 7 and signal group interfaces 1.

Each fader controller 7 is connected to a respective signal group interface 1. The fader controller 7 receives an input signal I (one of input signals $I_1, \ldots, I_n$) and supplies an appropriately fader controlled signal to a mixing bus M. The fader controller 7 operates under the control of the editor 3.

The signal group interface 1 receives signals from the fader controller 7. In response to commands issued from the human interface 13, the editor 3 provides editor command signals to the appropriate fader controllers 7 and to the appropriate signal group interfaces 1. These command signals control the signal group interfaces 1 and fader controllers 7 in accordance with the command issued.

For instance, a SOLO mode may be initiated when the operator desires to have only one specific audio signal mixed in with the video signal. When a SOLO command is received at the editor 3 from the human interface 13, the editor 3 issues a SOLO editor command signal to the signal group interface 1 corresponding with the signal to be SOLOed. That signal group interface 1 then connects the signal to be SOLOed with the solo line 18 and activates the SOLO mode through solo activate line 16. The other signal group interfaces 1 receive mute commands from the editor 3 for muting their associated VCAs and inhibiting their outputs from being mixed in with the video signal.

When a PREVIEW command is received at the editor 3 for a specific signal, the corresponding signal group interface 1 receives a preview command signal from the editor 3. That signal group interface 1 then connects the selected signal to the solo line 18. Thus, separate manual connectors for each signal are unnecessary as well as separate activate lines for the PREVIEW feature. Although the PREVIEW mode uses the solo line 18 and solo activate line 16, the editor 3 does not provide mute command signals to the other signal group interfaces 1 but may, depending upon the specified signal, send a mute command signal to the specified signal group interface 1.

Figure 2:
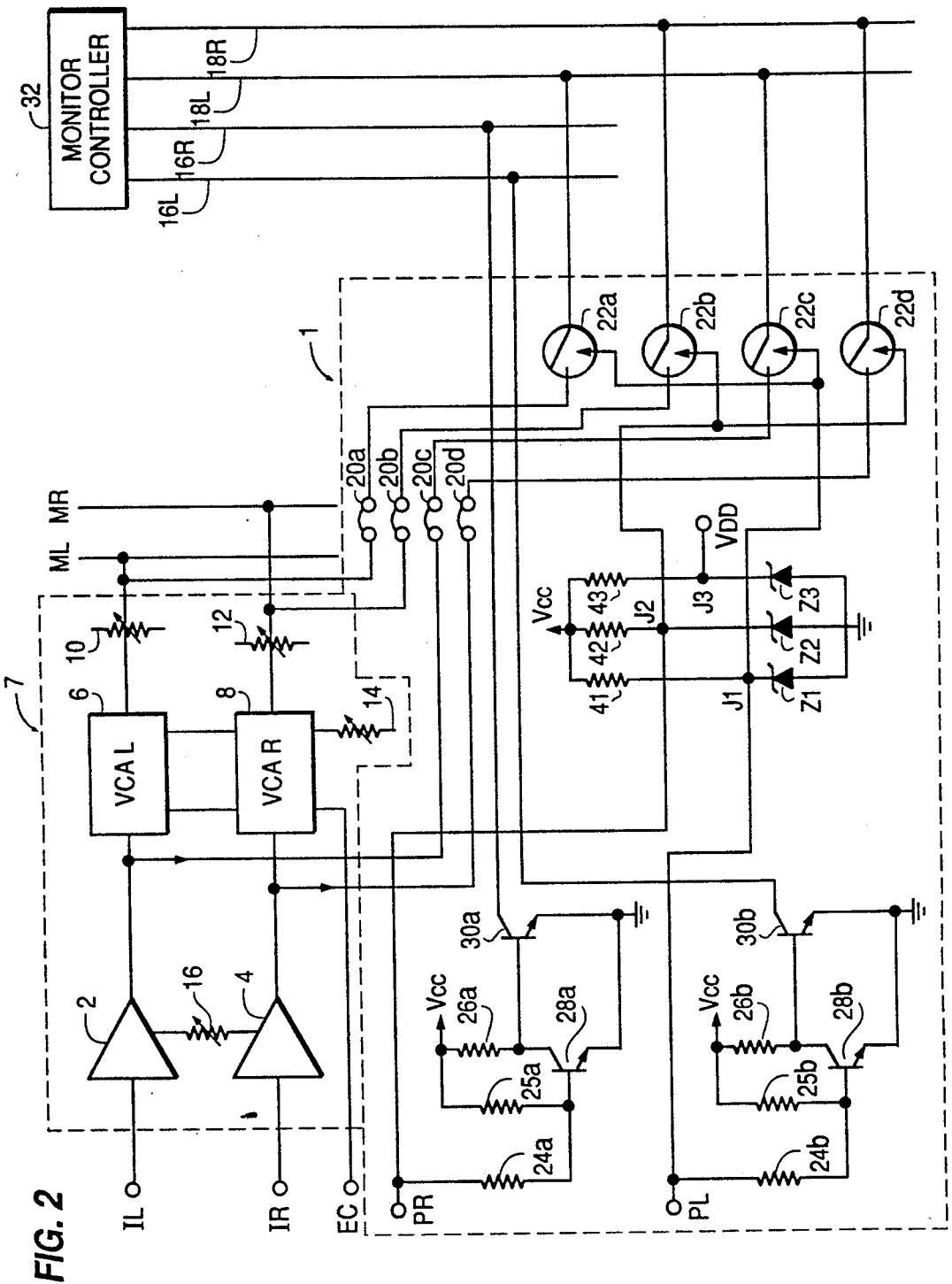
FIG. 2 illustrates a embodiment of the previewing circuit for the multi machine monitor of FIG. 1.

An embodiment of the signal interface 1 is illustrated in FIG. 2. An input signal, for example, may be an audio signal comprising a left input signal IL and a right input signal IR. The left input signal IL and right input signal IR are typically provided to preamplifiers 2 and 4 having a common adjustable gain varied, for example, by a variable resistor 16. The outputs of preamplifiers 2 and 4 are received at a left voltage controlled amplifier VCA L and at a right voltage controlled amplifier VCA R, respectively. The voltage controlled amplifiers VCA L and VCA R receive a FADE signal which may be generated from a variable resistor 14 for controlling the level of the input signals IL and IR. After passing through gain adjusters 10 and 12, the signals are received at a left mixing bus ML and at a right mixing bus MR.

The editor 3 produces an editor control signal EC that is supplied to the left and right voltage controlled amplifiers VCA L and VCA R. The editor control signal EC, among other functions, is capable of muting the VCAs. The editor 3 also produces left and right preview signals PL and PR, as well as signals (not shown) for controlling the state of switches 20a, 20b, 20c, and 20d.

The right preview signal PR is provided through a resistor 24a to a base of a transistor 28a. The base of transistor 28a is connected to a voltage source $V_{cc}$ through a resistor 25a. For example, the voltage source $V_{cc}$ is preferably on the order of +15 volts. Transistor 28a has its emitter grounded and its collector connected to the voltage source $V_{cc}$ through a resistor 26a. The collector of transistor 28a is also connected to a base of a transistor 30a. Transistor 30a has its emitter grounded and its collector connected to a solo activate line 16R. The right preview signal PR is additionally provided to switches 22b and 22d.

The left preview signal PL is provided through a resistor 24b to a base of a transistor 28b. The base of transistor 28b is connected to the voltage source $V_{cc}$ through a resistor 25b. The transistor 28b has its emitter grounded and its collector connected to voltage source $V_{cc}$ through a resistor 26b. The collector of transistor 28b is also connected to a base of a transistor 30b. Transistor 30b has its emitter grounded and its collector connected to a solo activate line 16L. The left preview signal PL is additionally provided to switches 22a and 22c.

The switches 20a and 20b control the connection between the post-fader signal lines and the switches 22a and 22b. The connection of the pre-fader signal lines to the switches 22c and 22d is controlled by the state of switches 20c and 20d. The state of the switches 20 is preferably controlled so that only the post-fader signals or the pre-fader signals may be provided to the switches 22 at one time. Thus, when switches 20a and 20b are closed for passing through the post-fader signals, switches 20c and 20d are opened. Conversely, when switches 20c and 20d are closed for passing through the pre-fader signals, switches 20a and 20b are opened.

The switches 22 are normally in an opened state to prevent the transmission of signals at their inputs to the solo line 18. Switches 22a and 22c receive the left preview signal and switches 22b and 22d receive the right preview signal. When a preview signal is received at one of the switches 22, the switch 22 closes to enable the signal received at its input from switch 20 to be transmitted through to the solo audio line 18.

Thus, when the switches 20a and 20b are closed, the post-fader signals will be transmitted to switches 22a and 22b. Then, for example, if a left preview signal is received, the left channel of the post-fader signal is provided to the left solo audio line 18L. A right preview may also be received for providing the right channel of the post-fader signal to the right solo audio line 18R.

When the switches 20c and 20d are closed, the pre-fader signals will be transmitted to switches 22c and 22d. Then, the left and right preview signals may selectively provide the left and/or right channels of the pre-fader signals to the solo audio lines 18L and 18R.

The solo audio lines 18L and 18R and the solo activate lines 16L and 16R are connected to a monitor/controller 32. The monitor/controller responds to a signal on the solo activate line 16L and/or 16R to couple the corresponding solo audio line 18L and/or 18R to a speaker. The speaker enables an operator to listen to the signal selected for the PREVIEW or SOLO. Additionally, the monitor/controller may receive a video signal in addition to or in place of the audio signals. The monitor may also display video signals in conjunction with the audio signals.

Resistors 41, 42, and 43 are connected to the voltage source $V_{cc}$ and also to the cathodes of zener diodes Z1, Z2, and Z3, respectively, with the anodes of zener diodes Z1, Z2, and Z3 being grounded. The right preview signal PR is provided to the junction J2 of resistor 42 and zener diode Z2 and the left preview signal PL is provided to the junction J1 of resistor 41 and zener diode Z1. The junction J3 of zener diode Z3 and resistor 43 has a voltage $V_{DD}$, which is, for example, preferably on the order of +3 volts.

When signals are not selected for previewing, the left and right preview signals PL and PR are at a logic value of "0." Thus, the junctions J1 and J2 are also at a low level, or ground, which maintains switches 22a to 22d in their open circuit state.

If, for example, the right preview signal PR is received, transistor 28a is switched on which, in turn, turns on transistor 30a. Transistor 30a then activates the PREVIEW mode through solo activate line 16R. The right preview signal PR also causes the junction J2 to rise to a logically high value of "1." Current then flows through a zener diode Z2 which maintains a junction J2 at a voltage of $V_{DD}$. The application of the voltage $V_{DD}$ to the switches 22b and 22d causes the switches 22b and 22d to close and provide, depending upon the state of the switches 20, the left channel of either the pre-fader signal or post-fader signal to the solo audio line 18R.

Similarly, if a left preview signal PL is received, transistors 28b and 30b are turned on which causes the PREVIEW mode to be activated through the left solo activate line 16L. The left preview signal also causes the junction J1 voltage to rise to the voltage $V_{DD}$ which results in the closing of switches 22a and 22c. Thus, the right channel of either the pre-fader signal or post-fader signal ma be provided to the solo audio line 18L.

In summary, switches 20 allow either the post-fader signals or pre-fader signals to be provided to switches 22. The switches 22 are then controlled by the left and right preview signals PL and PR to selectively provide the left and/or right channels to the solo buss 16.

The video editor 3 is preferably a dedicated programmed computer with time based signals which enable an audio event to track the video content. In a PREVIEW feature, an operator may rehearse or practice the positioning of audio information with respect to the video information before recording the audio on the tape. Upon the determination that a certain signal group should be previewed, the editor console 3 produces the appropriate editor control signal EC and left and right preview signals PL and PR. The left preview signal PL and right preview signal PR are decoded by logic together with mute command data in the editor 3.

In the signal group interfaces 1, signals are received from the editor 3 for muting the appropriate VCAs. The signals received from the editor 3 also select the left and/or right channels for previewing. This allows the editor to select any line in from the editor 3, the left and/or right channel, for monitoring purposes and mute, as appropriate, for the edit being executed.

Thus, the pre-fader signals may be previewed whether or not they are being used in a current mix. If the pre-fader signals are being used in a current mix, the previewing of the signals amounts to just a sampling of the signals and will not interfere with the recording of the mix. If the pre-fader signals are not being used in a mix, the editor 3 may send an editor command signal EC to the associated VCA for muting the output of that VCA. Therefore, the pre-fader signals may be previewed without effecting the signals on the mixing bus M. The post-fader signals may also be previewed while they are being used in a mix without interfering with the mix.

The invention enables an operator to rehearse the positioning of audio information with respect to the video information. The operator may then optimize the setting of the signal levels by individually previewing the left and/or right channels prior to recording. The editing time is thereby reduced while providing an improved finished product since the signal levels may be optimally preset. Another advantage of the present invention is that during a "live" recording, a signal source, which will be recorded, can have its level preset before going "live."

Additionally, the invention allows the separate control of left and right channels of an audio line to be previewed. The previewing also enables an operator to single out an unwanted noise. In other words, if, for example, a buzzing noise is being introduced into a mix, the operator can single out each signal, including the left and right channels separately, until the source of the buzzing noise is determined.

The foregoing description of a preferred embodiment of the invention has been presented for purposes of illustration and description. It is not intended to be exhaustive or to limit the invention to the precise form disclosed. Many modifications and variations are possible in light of the above teaching.

For example, the monitoring system may also be used with multi-track audio tape recorders. Also, although VCAs may be used for fader control, alternate means for producing a FADE signal may be used. The switches 20, switches 22, and transistors 28 and 30 are merely illustrative of a manner in which individual channels may be selected for a PREVIEW mode and a manner in which the SOLO mode may be activated. Alternate arrangements, such as with logic gates, may be used instead.

The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An apparatus for monitoring a signal line for use in an audio mixer comprising:
    an interface for receiving a preview command from an operator, said preview command enabling said operator to monitor said signal line without interfering with signals on a mixing bus; and
    control means for receiving said preview command from said interface and for transmitting at least one preview control signal to a line circuit associated with said signal line selected for monitoring;
    wherein said line circuit comprises means for selecting a signal for transmission to a monitor upon receipt of said preview control signal and means for activating said monitor upon receipt of said preview control signal for enabling said operator to monitor the selected signal.

2. An apparatus for monitoring a signal as set forth in claim 1, wherein said selecting means selects said signal from a group comprising a pre-fader signal, which is input into a fader, and a post-fader signal, which is output from said fader.

3. An apparatus for monitoring a signal as set forth in claim 2, wherein said pre-fader signal and said post-fader signal are audio signals having a left channel and a right channel and wherein said selecting means selects said left channel, said right channel, or both said left channel and said right channel, of either said pre-fader signal or said post-fader signal.

4. An apparatus for monitoring a signal as set forth in claim 1, wherein said selecting means uses a solo line for the transmission of said signal selected to said monitor, said solo line being used in a SOLO mode to only mix a single audio signal in with a video signal and exclude all other audio signals.

5. A method for monitoring a signal line for use in an audio mixer comprising the steps of:
    receiving at an interface a preview command from an operator;
    transmitting said preview command to a controller;

transmitting at least one preview control signal from said controller to a line circuit associated with said signal line selected for monitoring;

selecting a signal for transmission to a monitor upon receipt of said preview control signal; and activating said monitor upon receipt of said preview control signal;

wherein said preview command enables said operator to monitor said signal line without interfering with signals on a mixing bus.

6. A method for monitoring a signal line as set forth in claim 5, wherein said step of selecting a signal further comprises the step of selecting a left channel, right channel, or both said left channel and right channel of either a pre-fader signal, which is input into a fader, or post-fader signal, which is output from said fader.

7. A method for monitoring a signal line as set forth in claim 5, wherein said step of selecting said signal further comprises transmitting said signal selected to said monitor on a solo bus, said solo bus being used in a SOLO mode to only mix a single audio signal in with a video signal while excluding all other audio signals.

8. An audio mixer comprising:

an interface means for receiving a preview command from an operator which specifies a signal to be monitored;

an editor controller for receiving said preview command and for transmitting to a signal group interface associated with the selected signal at least one editor control signal;

wherein said signal group interface comprises means for connecting said selected signal to a monitor upon receipt of said one editor control signal and means for activating said monitor upon receipt of said one editor control signal and wherein said selected signal may be monitored at said monitor without interfering with signals on a mixing bus;

whereby said selected signal is automatically connected to said monitor after said operator inputs said preview command.

9. An audio mixer as set forth in claim 8, wherein said selected signal comprises a pre-fader signal, which is input to a fader, or a post-fader signal, which is output from said fader.

10. An audio mixer comprising:

an interface means for receiving a preview command from an operator which specifies a signal to be monitored;

an editor controller for receiving said preview command and for transmitting to a signal group interface associated with the selected signal at least one editor control signal;

wherein said signal group interface comprises means for connecting said selected signal to a monitor upon receipt of said one editor control signal and means for activating said monitor upon receipt of said one editor control signal;

whereby said selected signal is automatically connected to said monitor after said operator inputs said preview command;

wherein said selected signal comprises a pre-fader signal or a post-fader signal; and wherein a fader associated with said pre-fader signal and said post-fader signal receives a second editor control signal for selectively muting said fader whereby said selected signal can be monitored without interfering with an ongoing mix.

11. An audio mixer as set forth in claim 8, wherein said selected signal is transmitted to said monitor on a solo bus, said solo bus being used in a SOLO mode to only mix a single audio signal in with a video signal while excluding all other audio signals.

12. A multi machine monitor having an editor for receiving a preview command from a first interface and for generating editor command signals to a signal group interface and to a fader associated with said signal group interface, said fader receiving a pre-fader signal and generating a post-fader signal according to a fader control signal, said signal group interface comprising:

a first switching means for providing a selected signal to a monitor upon receipt of a first editor command signal from said editor;

a second switching means for providing said first switching means with either said pre-fader signal as said selected signal or said post-fader signal as said selected signal; and activating means for activating said monitor upon receipt of said first editor command signal;

wherein said selected signal is automatically connected to said monitor after said operator inputs said preview command and wherein said selected signal may be monitored without interfering with signals on a mixing bus.

13. A multi-machine monitor as set forth in claim 12, wherein said first switching means connects said selected signal to said monitor with a solo bus, said solo bus being used in a SOLO mode to only mix a single audio signal in with a video signal while excluding all other audio signals.

14. A multi-machine monitor having an editor for receiving a preview command from a first interface and for generating editor command signals to a signal group interface and to a fader associated with said signal group interface, wherein said fader receives a pre-fader signal and generates a post-fader signal according to a fader control signal, wherein said signal group interface comprises a first switching means for providing a selected signal to a monitor upon receipt of a first editor command signal from said editor, a second switching means for providing said first witching means either said pre-fader signal as said selected signal or said post-fader signal as said selected signal, and activating means for activating said monitor upon receipt of said first editor command signal, whereby said selected signal is automatically connected to said monitor after said operator inputs said preview command;

wherein said fader is muted upon receipt of a mute command from said editor whereby said pre-fader signal is monitored without interfering with a current mix performed by said multi machine monitor.

15. A multi machine monitor as set forth in claim 12, wherein said first interface is a human interface through which said editor also receives mutes commands, for muting selected signals, and solo commands, for supplying a single signal to said mixing bus.

16. An apparatus as set forth in claim 1, wherein the selected signal transmitted to said monitor is supplied to said mixing bus while only said selected signal is transmitted to said monitor.

17. An apparatus as set forth in claim 1, wherein the selected signal transmitted to said monitor is not supplied to said mixing bus and only said selected signal is transmitted to said monitor.

* * * * *